(12) United States Patent
Hughes et al.

(10) Patent No.: US 6,420,854 B1
(45) Date of Patent: Jul. 16, 2002

(54) BATTERY DETECTOR

(75) Inventors: Ronald Wayne Hughes, Thompson; Dennis Carl Plott, Mantua, both of OH (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/858,944

(22) Filed: May 17, 2001

(51) Int. Cl.⁷ .................................................. H02J 7/00
(52) U.S. Cl. ....................................... 320/165; 320/106
(58) Field of Search ................................. 320/165, 134, 320/106

(56) References Cited

U.S. PATENT DOCUMENTS

| | | |
|---|---|---|
| 5,422,560 A | 6/1995 | Yan |
| 5,539,298 A | 7/1996 | Perkins et al. |
| 5,686,808 A * | 11/1997 | Lutz ............................ 320/106 |
| 5,710,506 A * | 1/1998 | Broell et al. ................. 320/145 |
| 5,818,200 A | 10/1998 | Cummings et al. |
| 5,821,730 A | 10/1998 | Drapkin |
| 5,825,100 A | 10/1998 | Kim |
| 5,955,797 A | 9/1999 | Kim |
| 6,023,147 A | 2/2000 | Cargin, Jr. et al. |
| 6,100,880 A | 8/2000 | Thuerig et al. |
| 6,340,876 B1 * | 1/2002 | Saint-Pierre ................. 320/106 |

* cited by examiner

*Primary Examiner*—Gregory Toatley
(74) *Attorney, Agent, or Firm*—Christian C. Michel; Mark S. Bicks; Alfred N. Goodman

(57) ABSTRACT

An apparatus and method for detecting the presence of a battery in a battery charging circuit is provided. An inductor is placed in series with a charging circuit and the battery connection leads. A switching device and a capacitive device are connected in parallel to one another and in series with a gated device to form an indicator circuit. The indicator circuit is connected in parallel with the battery connection terminals. A series of pulses is applied to the gated device, allowing current to flow into the capacitive device during each pulse and energize the switching device when a battery is present. When no battery is present, the inductor prevents sufficient current from the charging circuit from energizing the capacitive device and the switching device.

19 Claims, 7 Drawing Sheets

BATTERY DETECTOR

FIELD OF THE INVENTION

The present invention is related to battery chargers. More specifically, the present invention is related to a battery charger that is capable of detecting the presence or absence of a battery connected across the battery charging terminals.

BACKGROUND OF THE INVENTION

Diesel firepump controllers and other systems that contain battery charging circuits often require a means to determine if a battery is connected to the charging circuit. Prior art systems typically monitor the output current of the charging circuit to verify the presence of a battery. Unfortunately, simply monitoring the output current of the charging circuit is not sufficient under all circumstances to verify connection of the battery across the charging terminals.

By way of example, additional circuit loading on the battery charger can mask the loss of low levels of float charge current, and prevent the detection of a disconnected battery. Also, external charging sources, such as engine-driven alternators, can temporarily raise the battery terminal voltage above float charge levels which will terminate the charging circuit's float charge current. Simple current monitoring schemes will falsely report battery disconnection in this case.

An example of a prior art battery detector is disclosed in U.S. Pat. No. 5,821,730 to Drapkin. The battery detection circuit uses a sensing resistor, in combination with a transformer, which has a dual secondary winding to sense current to the battery. When no load is present, there is little or no current through the sensing resistor, and a diode connected to the secondary winding is reverse biased. When a battery is present, current through the sensing resistor causes the diode to be forward biased, which in turn causes a step up in voltage at a node which turns on a transistor, indicating that a battery is present. Battery detecting techniques such as the battery detector disclosed in this patent fail to detect a false load which allows current to flow through the sensing resistor, resulting in a false battery detection.

Another example of a prior art battery detector is disclosed in U.S. Pat. No. 5,825,100 to Kim. This battery detector is an example of an electro-mechanical battery detector. When a battery is present, conduction surfaces are caused to contact connection points. The closed circuit between the connection points indicates that a battery is present. Unfortunately, this battery detection circuit will not detect whether the object inserted is actually a battery or not. Any physical object which causes the conduction surfaces to contact the connection points will be detected as a battery.

SUMMARY OF THE INVENTION

Accordingly, it is an object of the present invention to correctly detect the connection or disconnection of a battery from a charging circuit. A battery detector according to an embodiment of the present invention accurately detects the presence of a battery, even when external charging sources such as an engine alternator temporarily stop the charging circuit's current. A battery detector according to an embodiment of the present invention also accurately detects a disconnected battery, even in the presence of an unexpected circuit load that may draw current from the charging circuit.

These and other objects of the present invention are achieved by connecting a relatively low value inductor in series between the battery and the charging circuit. The series inductor provides a low resistance path for battery charging current when the battery is present. A relay and a capacitor are connected in parallel to each other and in series with a switching transistor. The relay, capacitor, and transistor combination is connected in parallel across the battery connector terminals. The transistor is activated periodically by a series of pulses. When a battery is present, current from the battery flows through the low resistance path to the capacitor, and energizes the capacitor and the relay when the transistor is turned on (during each pulse). If a battery is not present, the series inductor provides a high impedance path from the charging circuit to the capacitor and relay, preventing current from charging the capacitor, and in turn causing the relay to de-energize. A device according to the present invention works correctly, even in the presence of additional loading on the charging circuit or elevated battery voltage.

BRIEF DESCRIPTION OF THE DRAWINGS

These and other objects, advantages and novel features of the invention will be more readily appreciated from the following detailed description and in conjunction with the accompanying drawings in which.

Throughout the drawing figures, the same reference numerals will be understood to refer to the same parts and components.

DETAILED DESCRIPTION OF THE INVENTION

Figure 1:
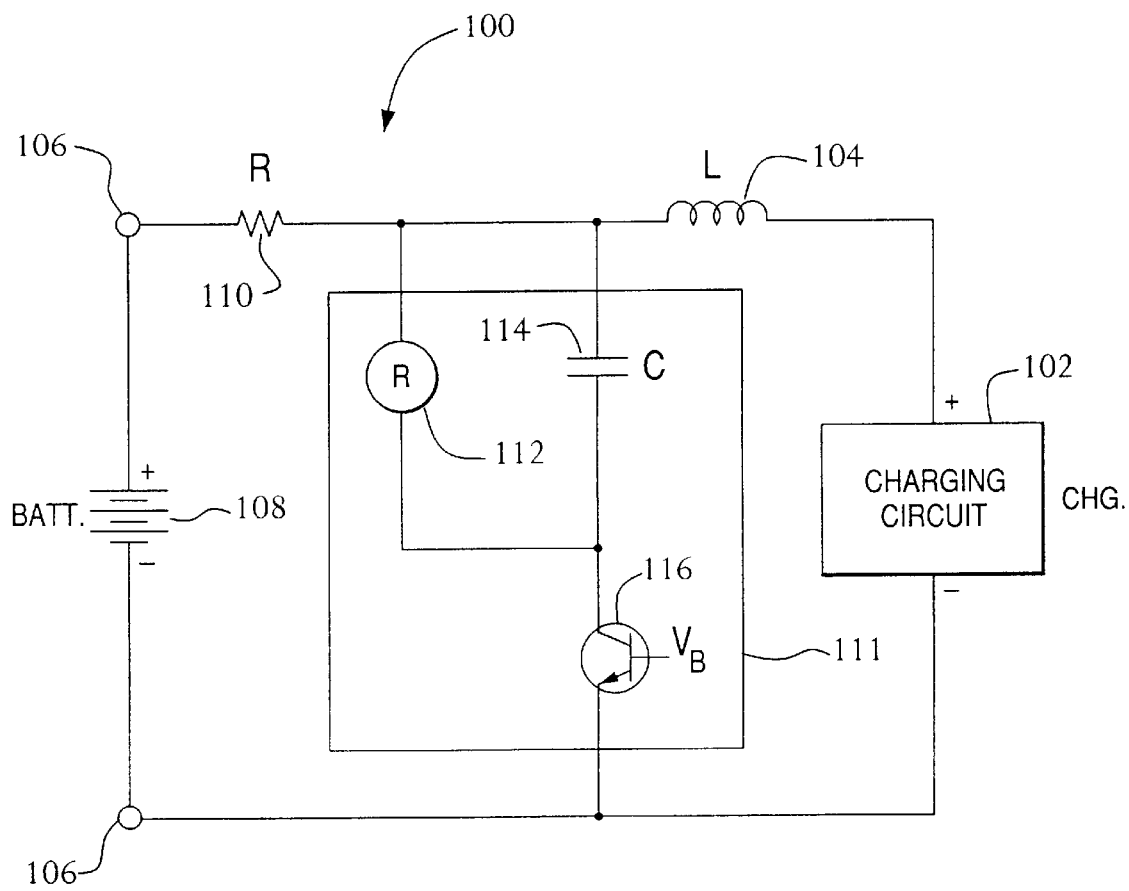
FIG. 1 is a circuit diagram illustrating an embodiment of the present invention.

A circuit 100 according to an embodiment of the present invention is illustrated in FIG. 1. A charging circuit 102 is connected in series to an inductor 104 and a set of battery terminals 106 for connecting a battery 108. A current limiting resistor 110 can be included in series with the battery 108. An indicator circuit 111 is connected in parallel across the battery terminals 106. The indicator circuit is comprised of a relay 112 connected in parallel to a capacitor 114. Indicator circuit 111 is further comprised of relay 112 and capacitor 114 both connected in series to a switching transistor 116. Those of ordinary skill in the art will recognize that any suitable switching device can be used in place of the NPN transistor shown in FIG. 1. The NPN transistor is shown merely for illustrative purposes. For instance, an FET can be used, or a simple mechanical switch can also be used. Series inductor 104 is placed in between the charging circuit 102 and the indicator circuit 111.

Figure 2:
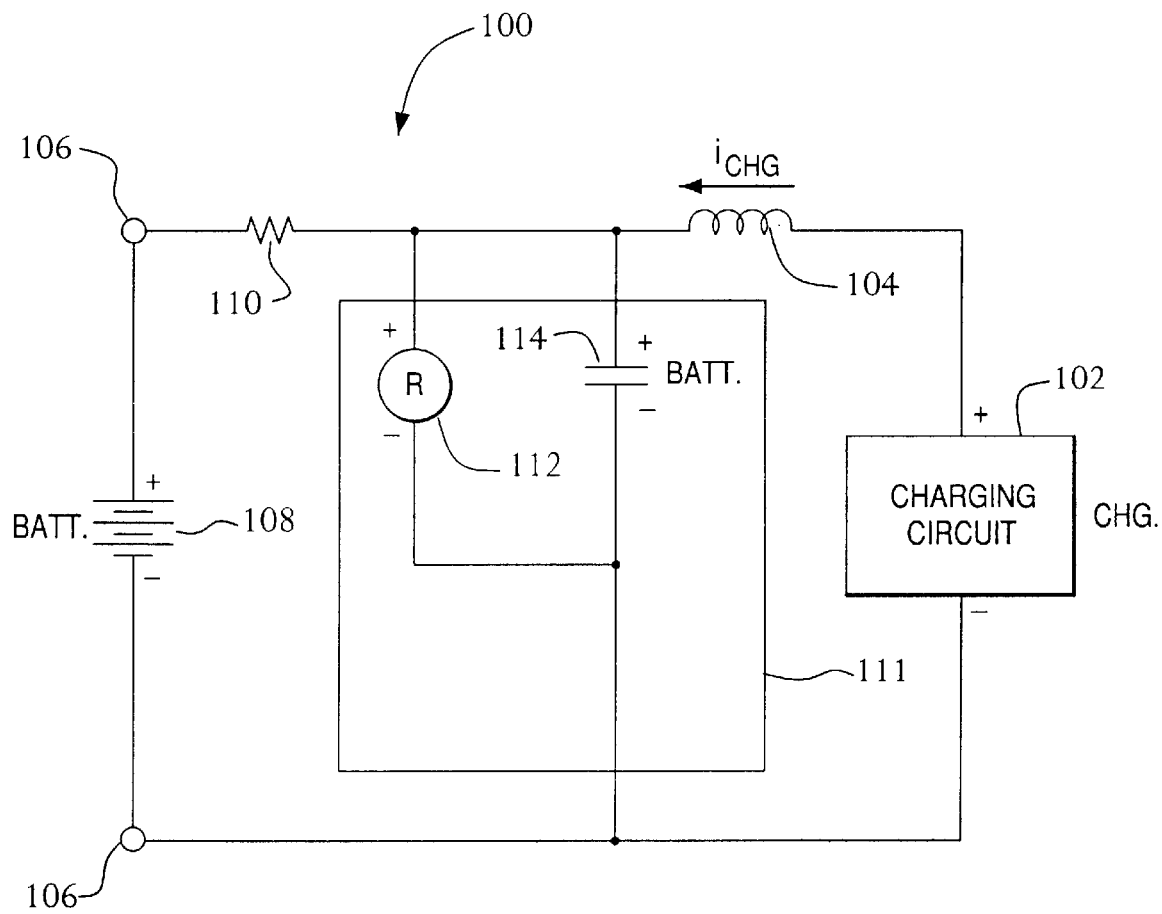
FIG. 2 is a circuit diagram illustrating an embodiment of the present invention showing a battery present.

FIG. 2 illustrates the operation of the circuit 100 when a battery 108 is connected across the battery terminals 106. A series of pulses are delivered to the base terminal of the transistor 116 (not shown), causing the transistor to conduct. The pulses may be generated and applied to the transistor in any conventional method familiar to those of skill in the art. During each pulse, the transistor conducts, and allows current from the battery 108 to flow into the capacitor 114, generating a voltage ($V_{batt}$) which energizes the relay 112. While a battery 108 is connected across the battery terminals 106, the inductor 104 provides a low impedance DC path for current from the charging circuit 102 to flow into the battery 108 and capacitor 114. Thus, introduction of the inductor 104 between the charging circuit 102 and the battery 108 does not limit the charge provided to the battery 108 by the charging circuit 102 under normal operating conditions.

Figure 3:
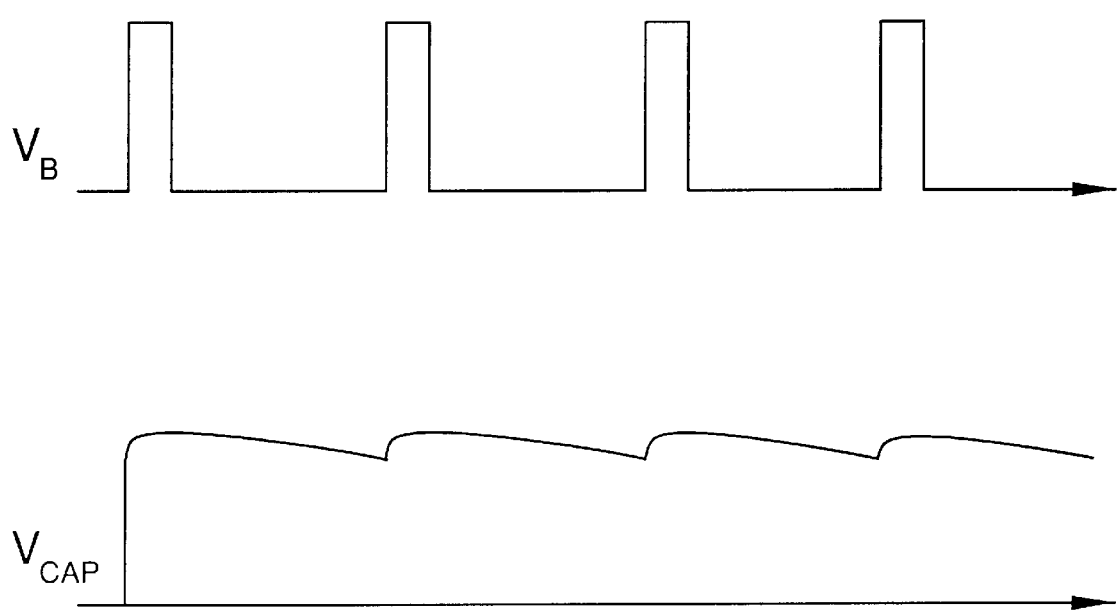
FIG. 3 is a timing diagram illustrating an embodiment of the present invention when a battery is present.

FIG. 3 is a timing diagram further illustrating the operation of the circuit 100 as illustrated in FIG. 2. $V_b$ represents pulses which are applied to the base terminal of the transistor 116 (not shown). $V_{cap}$ represents the voltage across the capacitor 114. As shown, the value of C is chosen such that $V_{cap}$ remains high in between pulses. This ensures that the relay 112 remains energized continuously while a battery 108 is connected to the battery terminals 106. Thus, when the relay 112 is in an energized state, the circuit indicates that a battery is connected to the charging circuit.

Figure 4:
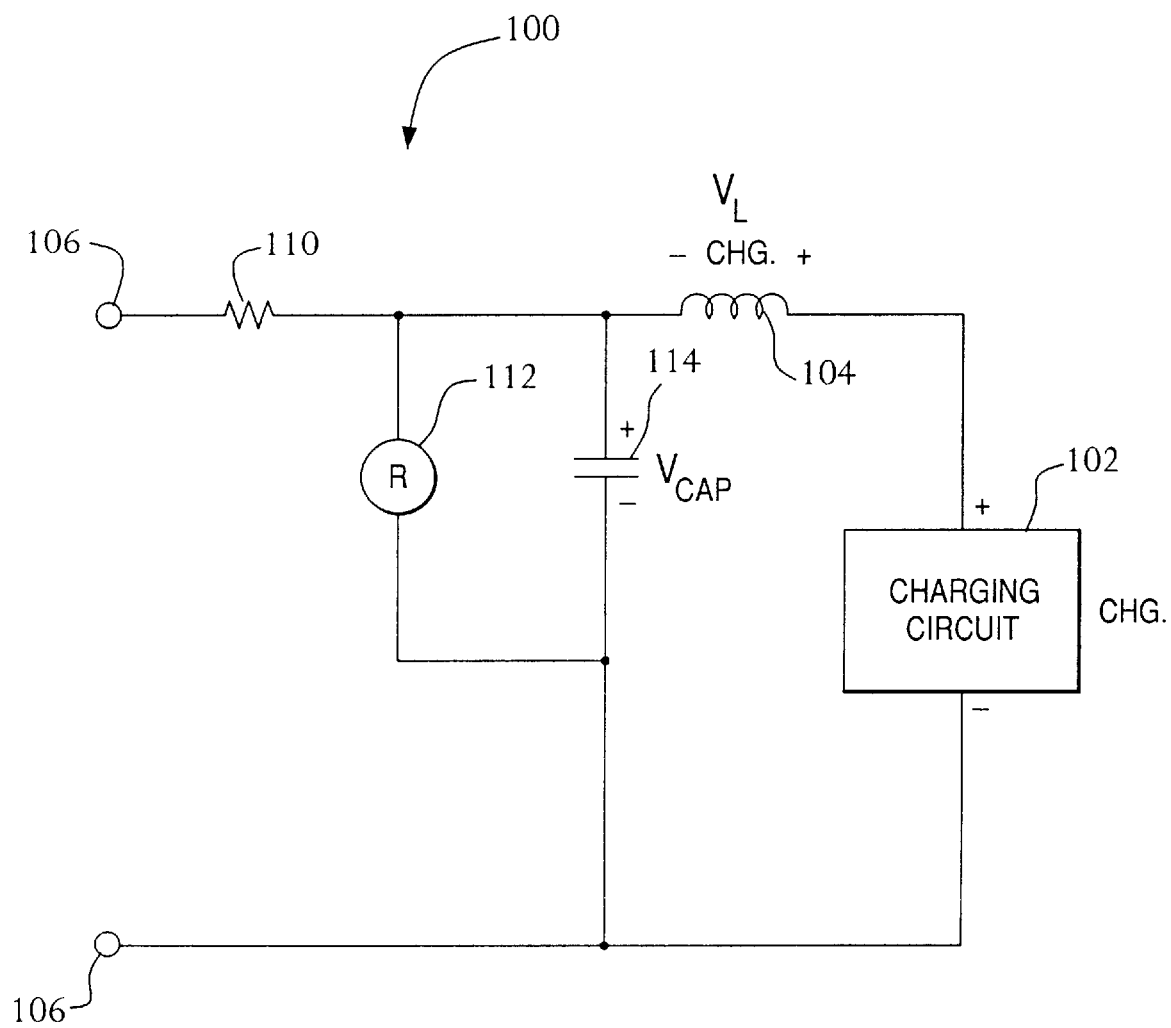
FIG. 4 is a circuit diagram illustrating an embodiment of the present invention showing a battery absent.

FIG. 4 illustrates the operation of the circuit 100 when a battery 108 is not connected across the battery terminals 106. Pulses continue to be applied to the base terminal of the transistor 116 (not shown), causing the transistor 116 to conduct during each pulse. Each time the transistor begins to conduct, a voltage is induced across inductor 104, which is approximately equal to the voltage across the charging circuit 102. A value of inductance of the inductor 104 is selected such that very little current flows into the capacitor 114 from the charging circuit 102 during the short pulses applied to the transistor. Between pulses, the transistor does not conduct, and current does not flow into capacitor 114.

Figure 5:
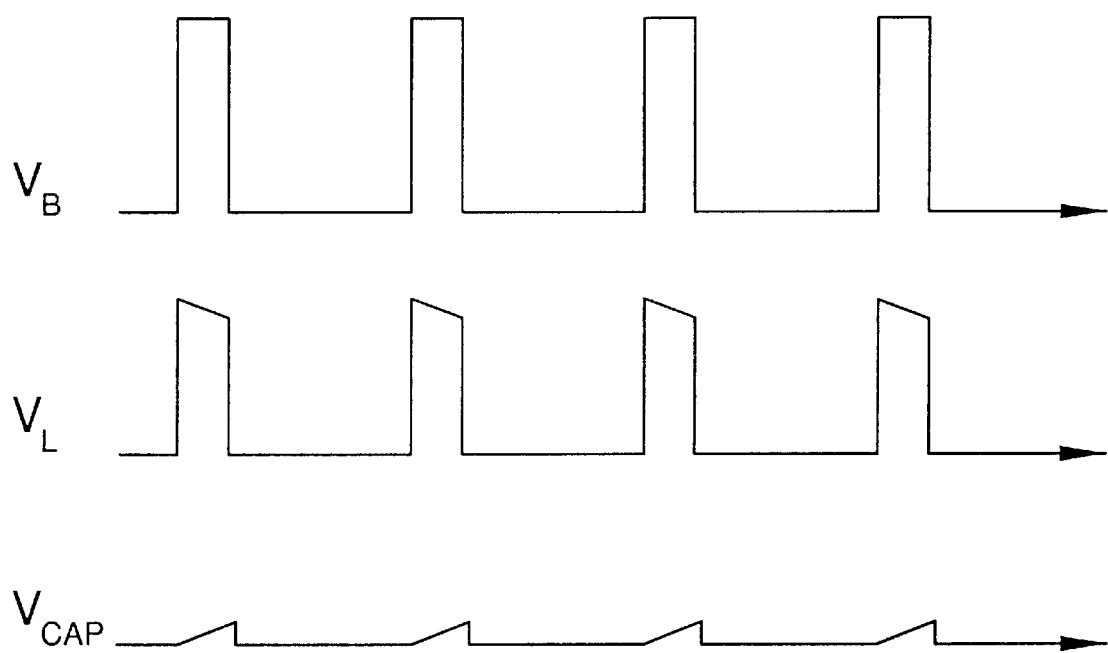
FIG. 5 is a timing diagram illustrating an embodiment of the present invention when a battery is absent.

FIG. 5 is a timing diagram further illustrating the operation of the circuit 100 as shown in FIG. 4. $V_b$ illustrates the pulses applied to the base terminal of the transistor 116 (not shown). Each time a pulse is applied to the transistor 116, the transistor 116 begins to conduct, inducing a voltage across the series inductor 104. Due to the inductor, current is not able to flow immediately into the capacitor 114. The value of the inductor and capacitor are chosen such that when the battery is not present, the voltage across the capacitor never reaches the value required to energize the relay 112. The voltage induced across the inductor ($V_L$) during the pulses is roughly equivalent to the voltage across the charging circuit. The voltage across the capacitor ($V_{cap}$) may increase slightly during the pulses, but not enough to energize the relay 112. Thus, when the relay 112 is not energized, the circuit 100 indicates that a battery is not connected to the charging circuit.

Figure 6:
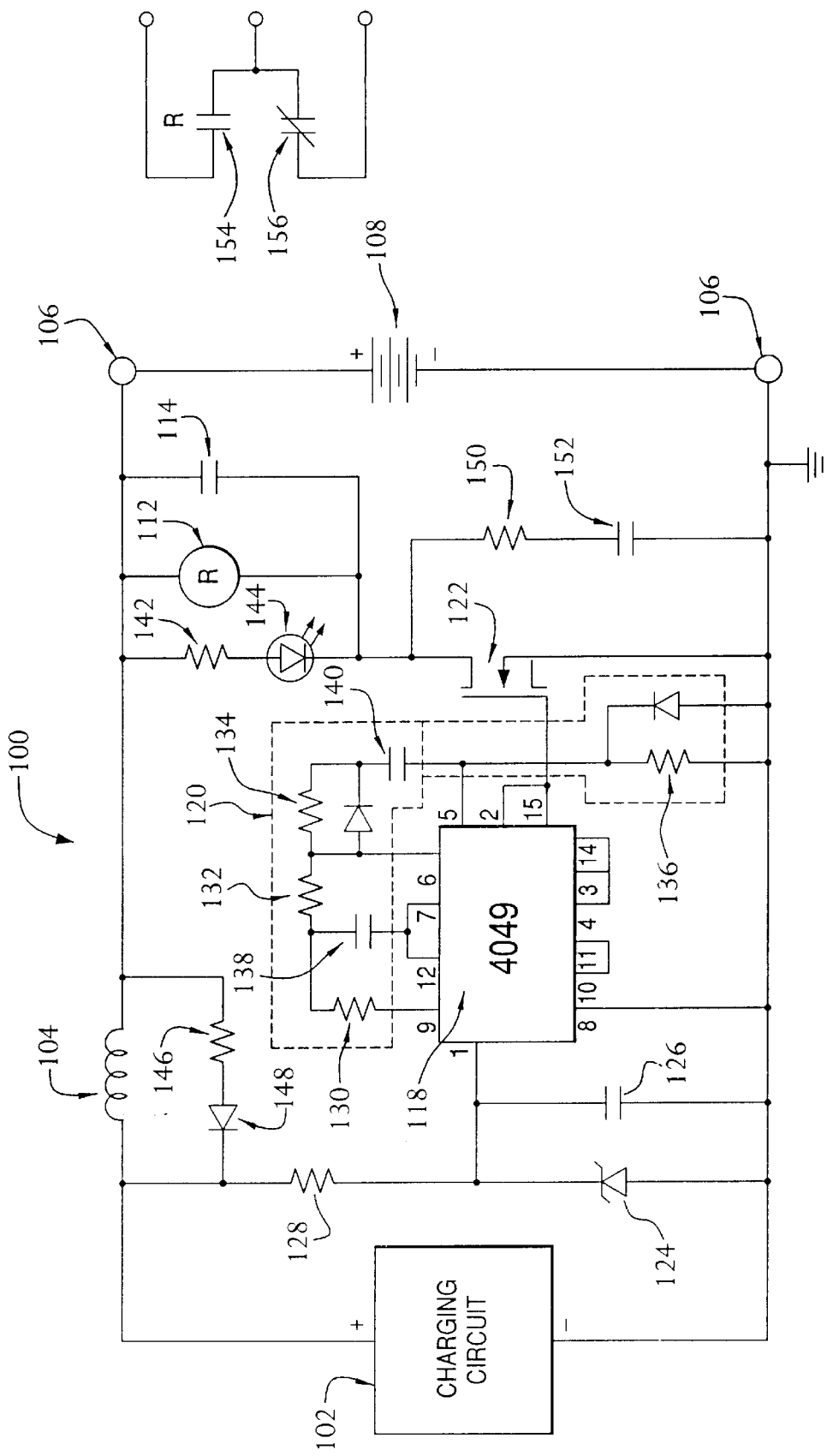
FIG. 6 is a schematic diagram of a 12 volt or 24 volt negative ground battery detector circuit showing component connections and values.

FIG. 6 shows an embodiment of the invention, including some of the components and connections that can be used in a circuit for charging 12V or 24V batteries. As shown, the circuit 100 includes an IC 118 which is connected to a network 120 of resistors, capacitors and diodes to generate pulses that are delivered to an FET 122. A 7.5V Zener diode 124, a capcitor 126, and a current limiting resistor 128 are used to deliver 7.5V supply voltage to pin #1 of the IC 118. Pin #8 of the IC 118 is connected to ground. The value of current limiting resistor 128 can be 750 ohms for a 12V battery charging circuit, or 2.7 k ohms for a 24V circuit. The IC 118 is a standard 4049 IC containing six buffer/invertors. As will be understood by those of skill in the art, the connection of the IC 118 to the network 120 provides an oscillator which delivers pulses to FET 122. By way of example, resistor 130 and 132 can have a value of 47 k ohms each. Resistors 134 and 136 can have a value of 20 k ohms in a 12V circuit, and 10 k ohms in a 24V circuit. Capacitor 138 can have a value of 0.01 Farads, while capacitor 140 can have a value of 0.0012 Farads.

The embodiment of the present invention illustrated in FIG. 6 is further provided with a current limiting resistor 142 and LED 144 which combine to visually indicate when a battery is detected. The embodiment is further provided with an energy dissipating resistor 146 and diode 148 to dissipate energy stored in inductor 104 in the event that battery 108 is suddenly disconnected. Resistor 150 and capacitor 152 form a snubber circuit that protects the FET 122 as will be understood by those of skill in the art. A normally open contact 154 and a normally closed contact 156 can be provided as output from the battery detection circuit.

Figure 7:
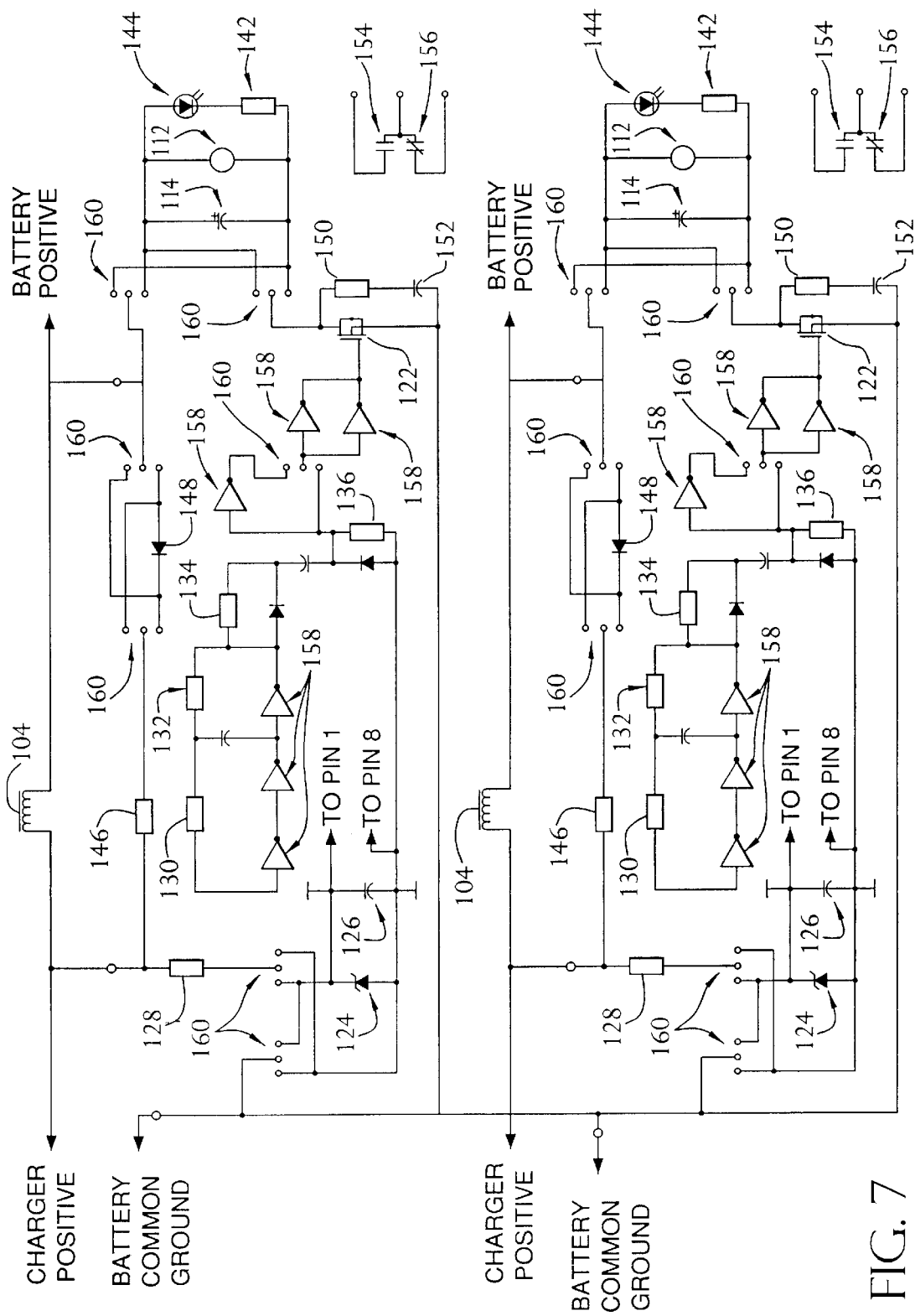
FIG. 7 is a schematic diagram of a dual 12 volt negative or positive ground battery detector circuit showing component connections and values.

FIG. 7 illustrates a dual battery charging circuit according to the present invention that is adapted to charge either positive or negative terminal ground batteries. The embodiment of FIG. 7 is essentially two circuits as described in FIG. 6. FIG. 7 illustrates how the buffer/intertors 158 of IC 118 are connected to the network 120 of resistors, capacitors and diodes. The embodiment of FIG. 7 also includes several jumpers 160 which provide a means for reversing the polarity of various circuit elements to accommodate positive or negative ground batteries, as will be understood by those of skill in the art.

It will also be understood by one of skill in the art that relay 112 and capacitor 114 can be replaced by a battery detecting resistor (not shown). In such an embodiment, when a battery is connected across the battery connection terminals 106, current flows from the battery 108 through the battery detecting resistor when the transistor 116 conducts, resulting in a potential drop across the battery detecting resistor. Conversely, when a battery is not connected across the battery connection terminals 106, current is prevented from flowing through the battery detecting resistor when transistor 116 conducts during the short pulses delivered to the transistor base terminal due to the inductor 104. Thus, no potential drop would occur across the battery detecting resistor when a battery was not present. In this embodiment, the presence or absence of a battery 108 connected across battery connection terminals 106 is detected by sensing the potential drop across the battery detecting resistor.

Although only a few exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included in the scope of this invention as defined in the following claims.

What is claimed is:

1. A battery detector comprising:
   a charging circuit and an inductor connected in series between two battery connection terminals; and
   an indicator circuit connected in parallel to the battery connection terminals, said indicator circuit comprising a switching device connected in parallel to a capacitor, said switching device and capacitor connected in series to a gated device;
   wherein said battery detector is adapted such that when a battery is connected across said battery terminals, said battery supplies current to charge said capacitor during conducting intervals of said gated device, said charge being sufficient to switch said switching device.

2. A battery detector as in claim 1, wherein said battery detector is further adapted such that when a battery is not connected across said battery terminal current is substantially prevented from flowing from said charging circuit to said capacitor during said conducting intervals of said gated device by said inductor, thereby preventing said switching device from switching.

3. A battery detector comprising:
  a charging circuit and an inductor connected in series between two battery connection terminals; and
  an indicator circuit connected in parallel to the battery connection terminals, said indicator circuit comprising a resistor connected in series with a gated device;
  wherein said battery detector is adapted such that when a battery is connected across said battery terminals, said battery supplies current through said resistor during conducting intervals of said gated device, causing a potential drop across said resistor.

4. A battery detector as in claim 1, wherein said battery detector is further adapted such that when a battery is not connected across said battery terminal current is substantially prevented from flowing through said resistor during said conducting intervals of said gated device by said inductor, thereby preventing a potential drop across said resistor.

5. The battery detector of claim 4, further comprising a potential sensing device for detecting the potential across said resistor.

6. A method of detecting the presence of a battery in a battery charging circuit having an inductor connected in series between said charging circuit and battery connection terminals comprising the steps of:
  applying a series of pulses to a gated device, said gated device being connected in series with a switching device connected in parallel with a capacitor, the gated device, switching device and capacitor being connected across said charging circuit and in parallel with battery connection terminals, such that said capacitor is energized with current from a battery connected across said battery connection terminals during said pulses, said capacitor being charged sufficiently during said pulses to cause said switching device to switch; and
  determining whether a battery is connected based on a state of said switching device.

7. The method of claim 6, wherein the value of said inductor is such that when a battery is not connected across said battery connection terminals, current is substantially prevented from flowing into said capacitor from said charging circuit during said pulses by said inductor.

8. A method of detecting the presence of a battery comprising the steps of:
  applying a series of pulses to a gated device, said gated device being connected in series with a switching device connected in parallel with a capacitor, the gated device, switching device and capacitor being connected across said charging circuit and in parallel with battery connection terminals;
  energizing said capacitor during said pulses sufficient to switch said switching device when a battery is connected across said battery connection terminals;
  preventing said capacitor from energizing during said pulses when a battery is not connected across said battery connection terminals; and
  determining whether a battery is present based on said switching device.

9. The method of claim 8, wherein said preventing step comprises the step of providing inductance between said charging circuit and said capacitor, said inductance selected to substantially prevent current flowing from said charging circuit to said capacitor during said pulses.

10. The method of claim 8, wherein said gated device is a transistor.

11. The method of claim 8, wherein said gated device is a field effect transistor.

12. The method of claim 8, wherein said switching device is a relay.

13. The method of claim 8, wherein said switching device is an optoelectronic isolation device.

14. A method of detecting the presence of a battery in a battery charging circuit having an inductor connected in series between said charging circuit and battery connection terminals comprising the steps of:
  applying a series of pulses to a gated device, said gated device being connected in series with a resistor, the gated device and resistor being connected across said charging circuit and in parallel with battery connection terminals, such that current flows through said resistor from a battery connected across said battery connection terminals during said pulses, said current causing a potential drop across said resistor; and
  determining whether a battery is connected based on said potential drop across said resistor.

15. The method of claim 14, wherein the value of said inductor is such that when a battery is not connected across said battery connection terminals, current is substantially prevented from flowing through said resistor from said charging circuit during said pulses by said inductor.

16. A method of detecting the presence of a battery comprising the steps of:
  applying a series of pulses to a gated device, said gated device being connected in series with a resistor, the gated device and resistor being connected across said charging circuit and in parallel with battery connection terminals;
  supplying current through said resistor during said pulses when a battery is connected across said battery connection terminals;
  preventing current through said resistor during said pulses when a battery is not connected across said battery connection terminals; and
  determining whether a battery is present based on a potential drop across said resistor.

17. The method of claim 16, wherein said preventing step comprises the step of providing inductance between said charging circuit and said resistor, said inductance selected to substantially prevent current flowing from said charging circuit through said resistor during said pulses.

18. The method of claim 16, wherein said gated device is a transistor.

19. The method of claim 16, wherein said gated device is a field effect transistor.

* * * * *